United States Patent [19]

Gareis et al.

[11] Patent Number: 4,628,397
[45] Date of Patent: Dec. 9, 1986

[54] PROTECTED INPUT/OUTPUT CIRCUITRY FOR A PROGRAMMABLE CONTROLLER

[75] Inventors: Ronald E. Gareis; Mark J. Kocher, both of Charlottesville, Va.

[73] Assignee: General Electric Co., Charlottesville, Va.

[21] Appl. No.: 617,095

[22] Filed: Jun. 4, 1984

[51] Int. Cl.[4] .......................................... H02H 3/093
[52] U.S. Cl. ........................................ 361/98; 361/57; 361/97; 361/101; 361/103; 364/483; 330/298; 330/207 P
[58] Field of Search ....................... 361/57, 63, 93, 97, 361/98, 103, 100, 101; 364/483; 357/23.1, 23.15, 92; 330/298, 207 P

[56] References Cited

U.S. PATENT DOCUMENTS

| | | | |
|---|---|---|---|
| 3,845,405 | 10/1974 | Leidich | 361/98 X |
| 4,095,094 | 6/1978 | Struger et al. | 235/304.1 |
| 4,293,924 | 10/1981 | Struger et al. | 364/900 |
| 4,333,120 | 6/1982 | Kotowski | 330/207 P X |
| 4,347,541 | 8/1982 | Chen et al. | 361/97 X |
| 4,355,344 | 10/1982 | Felici et al. | 330/207 P X |
| 4,381,456 | 4/1983 | Saito et al. | 307/40 |
| 4,394,724 | 7/1983 | Fry et al. | 323/287 X |
| 4,417,151 | 11/1983 | Klein et al. | 307/24 |
| 4,435,706 | 3/1984 | Callan | 340/825.08 |
| 4,535,409 | 8/1985 | Jindrick et al. | 364/483 X |

FOREIGN PATENT DOCUMENTS 1352913 5/1974 United Kingdom .
1513920 6/1978 United Kingdom .

OTHER PUBLICATIONS

Data sheets, RIFA Integrated Circuits PBD 3545 and PBD 3544 (2 pages each), RIFA-AB, Stockholm, Sweden.
"Smart ICS for Power Switching", Machine Design, May 10, 1984, pp. 60–65.
Digicable Manual, Direct Digital Industries, Inc., Lexington, Ky.

Primary Examiner—A. D. Pellinen
Assistant Examiner—Derek S. Jennings
Attorney, Agent, or Firm—Ormand R. Austin

[57] ABSTRACT

Input/output circuitry is disclosed for use in an I/O system of a programmable controller. The circuitry is protected against overcurrents without the use of fuses or circuit breakers, and is automatically restored to normal operation following correction of an overload condition. Diagnostic signals are produced for monitoring the operating condition of the circuitry. The invention includes an insulated gate transistor (IGT) having a main current section carrying a majority of the load current and an emulation section which carries a fractional portion of the load current. The emulation section current tracks the total current at all times. A current sensor monitors the emulation section current and provides a signal representing the instantaneous load current. This signal is continuously compared with preselected reference levels to derive a set of diagnostic signals that are indicative of the operating condition of the circuit, and whether output loads are open or shorted, for example.

17 Claims, 17 Drawing Figures

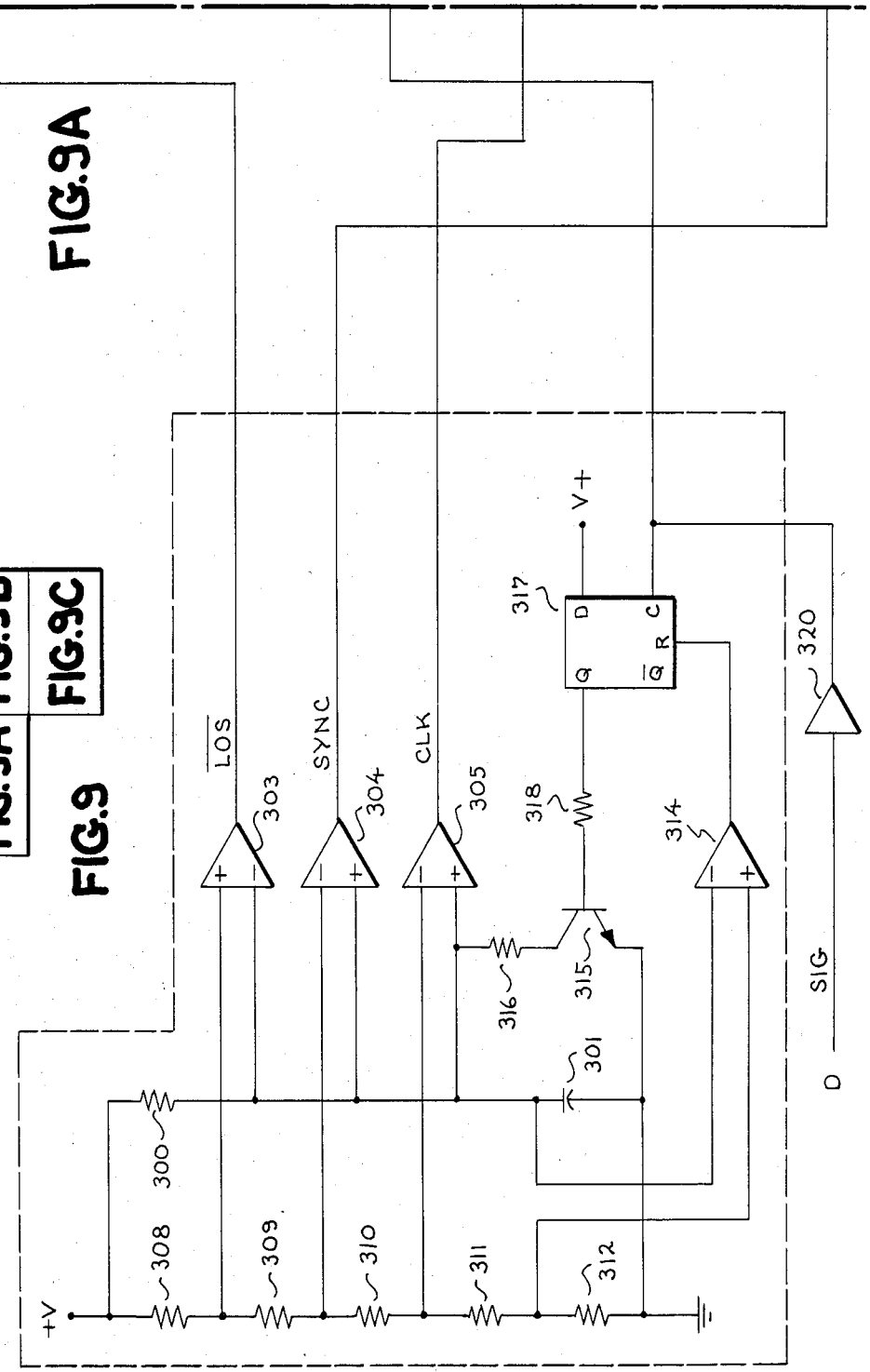

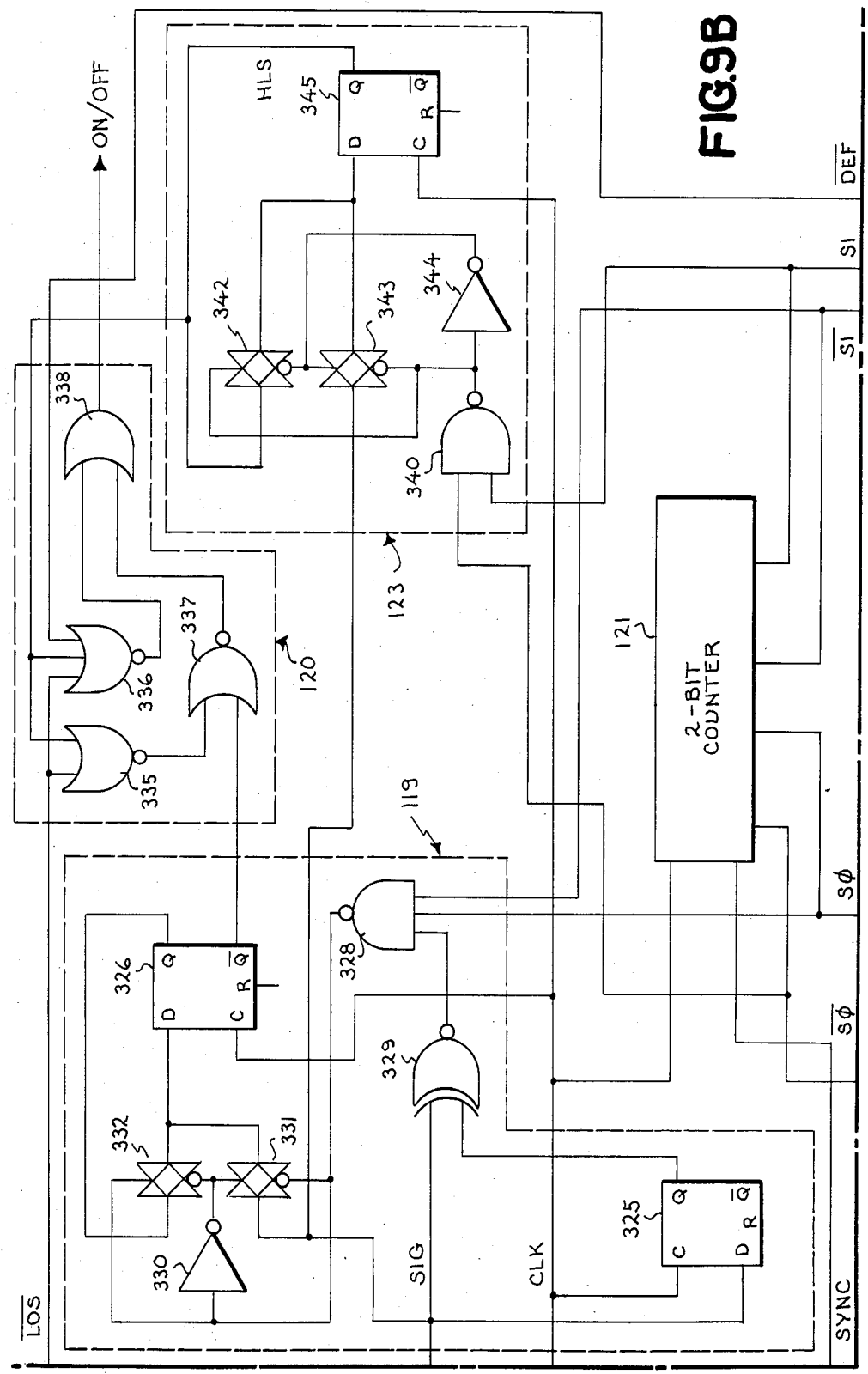

DATA ENCODING

| ON/OFF | >2A | <.05A | OVER TEMP | LOAD VOLTS PRESENT | OVER CURRENT SHUT DOWN | LOW VOLTAGE | HLS | DEF | XØ | X1 | X2 | X3 |
|---|---|---|---|---|---|---|---|---|---|---|---|---|
| X | X | X | X | X | X | — | X | X | ø | ø | ø | ø |
| X | X | X | X | ø | ø | ø | ø | ø | ø | — | ø | ø |
| X | X | X | X | ø | ø | ø | ø | — | ø | — | ø | — |
| X | X | X | X | ø | ø | ø | — | ø | ø | — | — | ø |
| X | X | X | X | ø | ø | ø | — | — | ø | ø | — | — |
| — | X | X | X | ø | — | ø | X | X | ø | ø | ø | — |
| — | ø | ø | ø | — | ø | ø | ø | ø | — | — | ø | ø |
| — | ø | ø | ø | — | ø | ø | ø | — | — | — | ø | — |
| — | ø | ø | ø | — | ø | ø | — | ø | — | — | ø | ø |
| — | X | X | — | — | ø | ø | — | — | — | — | — | — |
| — | X | — | ø | — | ø | ø | X | X | — | ø | — | — |
| — | — | X | ø | — | — | ø | X | X | — | ø | ø | ø |
| — | X | X | X | — | X | ø | X | X | — | ø | ø | — |
| ø | X | X | X | — | X | ø | X | X | — | ø | — | ø |

FIG. 10

PROTECTED INPUT/OUTPUT CIRCUITRY FOR A PROGRAMMABLE CONTROLLER

The present invention relates in general to methods and apparatus for use with "programmable controllers"; and in particular to an intelligent input/output system therefor.

BACKGROUND OF THE INVENTION

Process control with a programmable controller involves the acquisition of input signals from various process sensors and the provision of output signals to controlled elements of the process. The process is thus controlled as a function of a stored program and of process conditions as reported by the sensors. Numerous and diverse processes are, of course, subject to such control, and sequential operation of industrial processes, conveyor systems, and chemical, petroleum, and metallurgical processes may all, for example, be advantageously controlled by programmable controllers.

Programmable controllers are of relatively recent development. A state of the art programmable controller comprises a central processing unit (CPU) made up, broadly, of a data processor for executing the stored program, a memory unit of sufficient size to store the program and the data relating to the status of the inputs and outputs, and one or more power supplies. In addition, an input/output (I/O) system provides the interface between the central processing unit and the input devices and controlled elements of the process being controlled.

Input/output systems have remained relatively unchanged since the advent of programmable controllers and are the feature most in need of improvement. While some advances have been made in I/O systems, the improvements have generally been along the same lines as those followed in the past. For example, U.S. Pat. No. 4,293,924 describes an I/O system wherein the density of the interface is increased. Another approach, illustrated by U.S. Pat. No. 4,247,882, has been to concentrate on improving the housing for the input/output system. With the increased complexity of the processes requiring control, and with a need for a greater exchange of information between the process and the central processor, however, other improvement approaches to I/O problems have been needed.

The conventional I/O system is composed of a number of individual I/O points, each one of which is devoted to either receiving the signal from an input device (e.g., a limit switch, pressure switch, etc.) or to providing a control signal to an output device (e.g., a solenoid, motor starter, etc.), depending on how the circuitry for the particular I/O point is configured. That is, an I/O point is dedicated to being either an input point or an output point and is not readily converted from one use to the other.

One problem with state of the art I/O systems (particularly when used with a complex process) is the high cost of installation. Typically, I/O modules, or circuit cards, are housed in card racks or cages. For control of an extensive or complex process, a large number of I/O points must be provided in each rack or cage. This necessarily entails a great deal of wiring expense (both for labor and for materials) since wires from all of the input and output devices must be brought into the I/O rack.

Additional problems then arise from use of a large I/O rack since it is frequently difficult to bring all of the wires into the rack to make the terminations. Although it is well-known to provide at least a portion of an I/O system in an enclosure or rack remote from the CPU (in an attempt to get the I/O closer to the process being controlled), these problems are still not overcome since there is a concentration of input/output wiring into a single (albeit remote) location. Further complications arise in dissipating heat in a concentrated I/O system and, for that reason, it is frequently necessary to operate an I/O system at less than its optimum rating.

Another problem with present I/O systems is that they are difficult to diagnose and troubleshoot—whether the malfunctions occur in the programmable controller, per se, or in the controlled process. Experience has shown that most on-line failures associated with a controller occur in the I/O system. The CPU portion is now highly refined, having benefited greatly from the advances in microprocessor technology and data processing, for example. When an electrical failure does occur, however, early detection and diagnosis of the precise nature of the problem is often critical. It is naturally desirable to detect a failed part through an advanced warning rather than after some part of the process is out of control.

With state of the art I/O systems, early detection or failures is difficult, and even when a failure is signaled its precise location and nature may not be apparent. In many cases it is even difficult to separate controller I/O failures from failed elements (e.g., motors, pushbuttons, etc.) in the process. Diagnostic features, particular for the controller I/O system, have simply been lacking. Improvements for diagnosing and preventing I/O system failures have therefore been eagerly sought.

The problem of diagnosing failures is at times made difficult because each I/O point is ordinarily protected by a fuse. Although the fuse protects the particular I/O module from overcurrent, frequently it adds to the problem. For example, mere transient current may blow the fuse, leaving the I/O point completely inoperative until the failed point can be located and the fuse replaced.

Somewhat related is the problem of exchanging diagnostic and control information between a controlling portion and a controlled portion of an I/O system. For example, it may occur that distributed I/O modules are used to configure an I/O system. In such case it is desirable to provide simple, reliable means and methods for exchanging such information.

Yet another drawback of conventional I/O systems is that (as was mentioned above) each I/O point functions strictly as an input point or as an output point. The same point may not readily be converted from one use to the other. The user of a programmable controller is therefore required to select input and output functions separately, based on an an initial estimate of needs. There is a decided lack of flexibility for unforeseen future needs. Moreover, since I/O points are typically available in groups (e.g., six or eight points per circuit card), there is frequently a large number of unused I/O points in a control system.

Accordingly, the principal object of the present invention is to provide an input/output system which overcomes these shortcomings of conventional I/O systems. More particularly, however, it is sought to provide an I/O system wherein each I/O point may be selected to operate either as an input point or as an output point.

In addition, it is sought to provide an input/output system wherein each I/O point is self-protected against overcurrent and overvoltage conditions without the use of fuses or circuit breakers and wherein each I/O point is continuously and automatically diagnosed for failure, both within the I/O system and within the controlled process, and wherein detected failures are identified and automatically reported. A further, specific object of the invention is to provide an I/O system which is simple and economical to wire and use and which provides individual I/O points in distributed groups, or modules, for location in close proximity to the process, or particular part of the process to be controlled. An additional object of the invention is to provide an I/O system which includes means for monitoring, controlling, and troubleshooting each I/O point independent of the conventional central processor unit. Still further objects, features, and advantages of the invention will appear from the ensuing detailed description.

SUMMARY OF THE INVENTION

The present invention provides input/output circuitry capable of producing diagnostic and control information in an intelligent I/O system for a programmable controller. Input/output circuitry according to the invention is protected against overcurrents without the use of fuses, circuit breakers, and so forth and is capable of being automatically restored to normal operation following correction of an overload condition.

In preferred form the invention includes an insulated gate transistor (IGT) having a main current section through which the majority of the load current passes and an emulation section which passes a small fractional portion of the total load current. The emulation section current tracks the total current at all times. The IGT is capable of being gated both into and out of conduction to control the load current. Current sensing means disposed to sense the emulation section current provides a signal representing the instantaneous load current. This signal is continuously compared with a preselected reference level to derive a diagnostic signal that is indicative of whether the load current is in excess of the reference value. This diagnostic signal is useful to cause the IGT to be shut off substantially instantaneously, or to be shut off at some point in time depending on the time duration of the excess current and its magnitude. In other aspects, circuitry according to the invention provides second and third diagnostic signals which are indicative, respectively, of whether the total IGT current is excessively high requiring an immediate shut down of the IGT or is so low as to indicate an open or disconnected load. Additional diagnostic signals are generated for monitoring load voltage, line voltage, and temperature. These diagnostic signals provide for immediate detection and location of a fault condition and may be transmitted to a central processing unit remotely located from distributed input/output modules.

BRIEF DESCRIPTION OF THE DRAWINGS

While the specification concludes with claims particularly pointing out and distinctly claiming the subject matter regarded as the invention, the invention will be better understood from the following description taken in connection with the accompanying drawings in which:

FIGS. 9A, 9B, and 9C are schematic diagrams, illustrating in detail, a communications section for the I/O point of FIG. 4; and FIG. 10 is a truth table relating diagnostic and status data to a 4-bit coded signal for providing combinatorial logic in a state encoder for the communications section of FIG. 4.

DETAILED DESCRIPTION OF THE INVENTION

Figure 1:
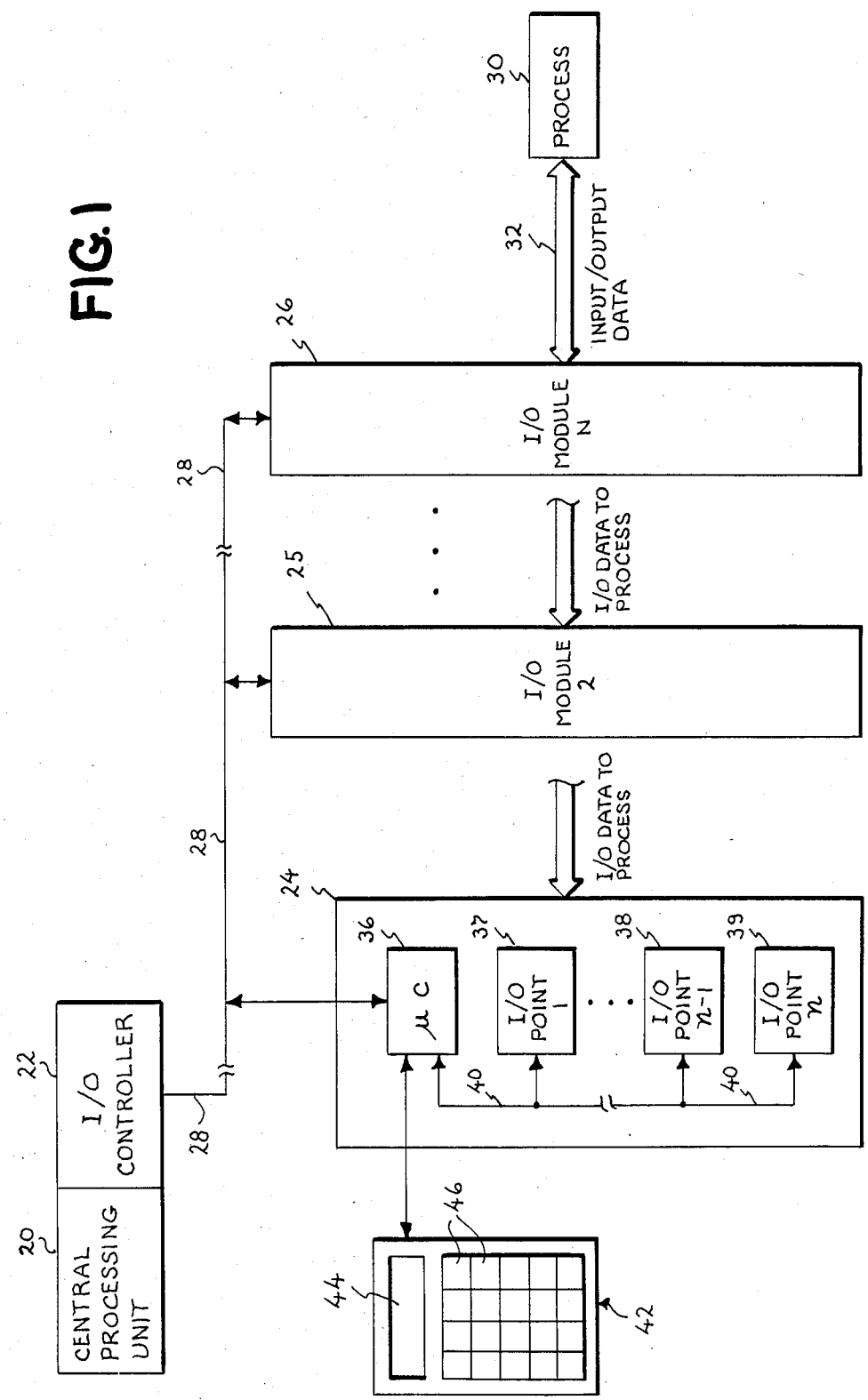
FIG. 1 is a simplified block diagram of a programmable controller system including an intelligent input/output (I/O) system in accordance with the present invention.

The programmable controller of FIG. 1 includes a central processing unit (CPU) 20, an input/output (I/O) controller 22, a plurality of input/output modules 24-26, and a data communications link 28 which interconnects each I/O module 24-26 with the I/O controller 22. These items, exclusive of CPU 20, generally comprise the input/output system of the controller. The CPU 20 is substantially of conventional design and may include one or more microprocessors for data handling and control, plus memory for storage of operating programs, input/output data, and other computed, interim, or permanent data for use in executing the stored program and for implementation of control. In addition, other conventional elements, such as power supplies, are included as necessary to make the CPU 20 fully functional. The I/O controller 22 provides for control of information exchanged between the various I/O modules 24-26 and the CPU 20.

Each I/O module 24-26, may be separately located, remote from CPU 20 and I/O controller 22, and in close proximity to the process being controlled. Although only three I/O modules are illustrated in FIG. 1, it will be understood that the actual number may be considerably greater. For example, sixteen separate I/O modules may be readily accommodated in the system to be described herein. Each I/O module is independent of the other and each may be devoted to control of a process separate from that controlled by all other I/O modules.

In FIG. 1, for example, the Nth I/O module 26 is illustrated to control a generalized process 30. The input and output signals associated with process 30 are conveyed by conductors 32 which run between the process 30 and the I/O module 26. The process 30 may, of course, take virtually any form. In any case, however, it includes various sensors, switches, etc. (not specifically illustrated) for sensing the status and condition of the process 30. The information from the process is in the form of input signals to I/O module 26. The process 30 also includes controlled elements (e.g., pumps, motors, etc.—also not illustrated) which receive the output signals from the I/O module 26 and which thereby effect control of the process 30. In similar fashion each of the other I/O modules 24, 25 is interconnected to input and output devices and apparatus associated with a process.

The data communications link 28 is preferably a serial link although parallel transmission of signals between the CPU 20 and the I/O modules 24-26 may be readily provided. In either case, I/O modules 24-26 are connected to the communications link 28 for communication with CPU 20. The communications link 28 may comprise a twisted pair of conductors, a coaxial cable, or a fiber optics cable; all are acceptable depending on such considerations as cost and availability.

In FIG. 1, I/O module 24 illustrates in block diagram form the general overall electronic structure of each I/O module.

Thus, there is included a microcontroller 36 having an interface port for exchanging information with CPU 20 and including an associated memory (not illustrated) for implementation of a stored program of operation according to which the various elements of the I/O modules are controlled and diagnosed for incurred faults; a plurality of individual I/O points (or, "I/O circuits") 37-39, each of which may be selectably operated either as an input point or as an output point and each of which interfaces individually through conductors directly to input or output elements of the controlled process; and a conductor bus 40 for interconnecting the I/O points 37-39 to the microcontroller 36. The number of I/O points 37-39 in any particular I/O module 24-26 depends on practical considerations such as heat dissipation and the limitations of the microcontroller 36. As an example, however, it has been found quite practical and convenient to provide sixteen I/O points per I/O module.

For verifying the integrity and functionality of the input and output components and for maintenance and troubleshooting, monitoring apparatus 42 is provided. The monitor 42 is prefeably sized to be hand held so that it can be readily and conveniently moved from one I/O module to the other. It is adapted for connection into each I/O module by a cable which includes a connector for mating with another connector affixed to the I/O module. The cable and mating connectors are schematically illustrated in FIG. 1 which shows the monitor 42 connected to I/O module 24 through an interface port of the microcontroller 36.

When connected to an I/O module, the hand-held monitor 42 allows the I/O points of that module to be monitored and controlled and provides a display of diagnostic information pertaining to the module. Advantageously, the hand-held monitor performs these functions independently of the central processing unit 20 and even without the CPU 20 being present. The monitor 42 is operative, for example, to turn output points on and off and to read the state of the input points. In case a fault has occurred, the monitor 42 can also provide an indication of the nature and location of the fault. The hand held monitor 42 may be noted to include a data display panel 44 which displays alpha numeric characters and a set of key switches 46 which provide for address programming and for effecting operation of the I/O modules 24-26.

Figure 2:
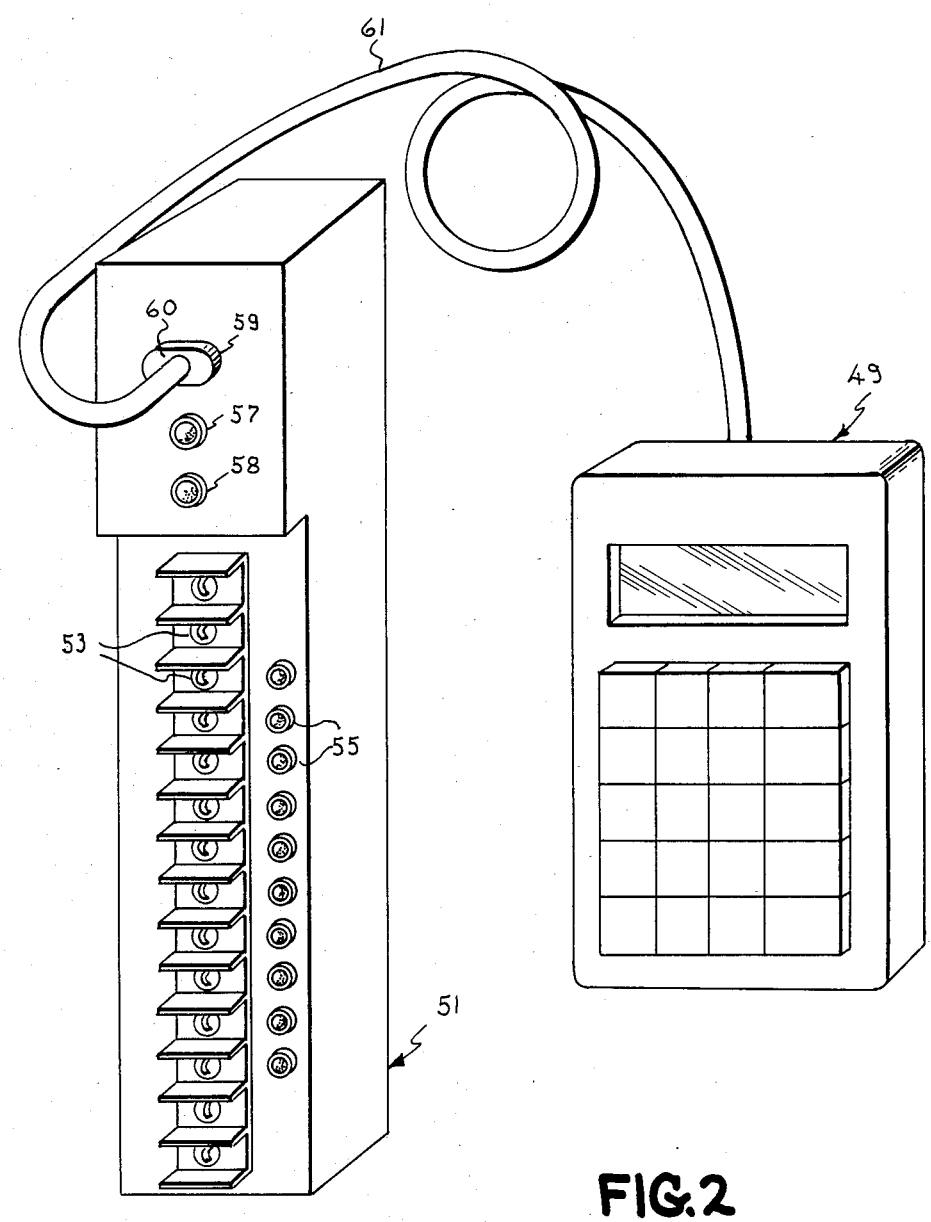
FIG. 2 is a perspective illustration of one possible physical form for an individual I/O module and a handheld monitor, both configured for use in the I/O system of FIG. 1.

Referring now to FIG. 2, preferred physical forms for a hand-held monitor and an individual I/O module are illustrated. Thus, the illustrated I/O module 51 is substantially in the form of a terminal block which includes a row of conductor terminals 53 for making connection to the conductors that connect with the input and output devices of of the controlled process. The terminals 53 may be in the form of screw-type connections in which the screws are tightened down on a connecting wire or terminal lug. Each I/O circuit is assigned to a corresponding terminal connection. In addition, terminals are assigned for connecting an external power source (ac or dc) and for making connections to the data communication link as shown in FIG. 1. Visual indicators are provided, in the form of light emitting diodes (LEDs) 55 to indicate the status of each I/O point. Additional LEDs 57 and 58 provide an indication of the operational status of the module 51. For example, LED 57 indicates that a fault condition is present (either internal or external to the module) and LED 58 indicates normal operating conditions. A connector 59 is provided on the module 51 for mating with a cable connector 60, and, through cable 61, to hand-held monitor 49.

The illustrated hand-held monitor 49, as described above and in connection with FIG. 1, is able to exercise the I/O module to which it is connected. That is, the hand-held monitor allows an I/O module to be operated and thoroughly checked out even if it is not connected to a central processing unit as shown in FIG. 1.

Figure 3:
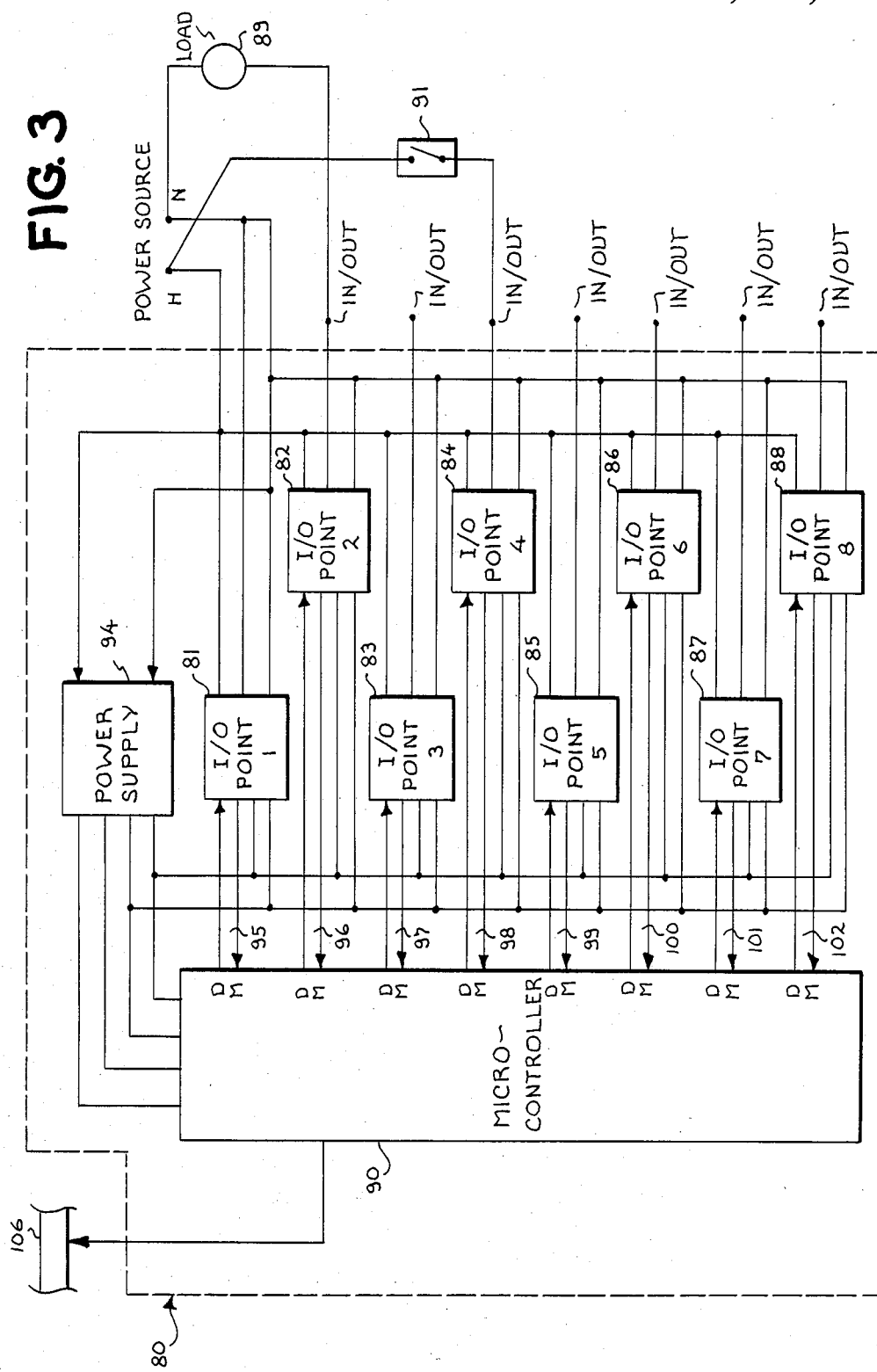
FIG. 3 is a block diagram illustrating in greater detail one of the I/O modules of FIG. 1.

The block diagram of FIG. 3 illustrates an I/O module 80 (substantially the same as any one of modules 24-26 of FIG. 1) in greater detail. The I/O module 80 thus includes a group of 8 separate I/O points 81-88, each one of which exchanges control and diagnostic information signals with microcontroller 90. Electrical power, either ac or dc, is supplied at terminals H and N. The power source connected to terminals H and N provides power both to an internal dc power supply 94 and to any external output loads (e.g., controlled elements) which are controlled by the programmable controller of which module 80 is a part. Power supply 94 is simply the dc power supply for all elements contained in the I/O module 80 which require dc power in their operation.

Each I/O point 81-88 is connected to the microcontroller 90 by a pair of conductors 95-102, respectively. One conductor of each pair, designated the D line, conveys control data to the associated I/O point; the other line, designated the M line, conveys status and diagnostic information from the I/O point to the microcontroller 90. Each I/O point 81-88 is also connected to receive dc power (e.g., 15 volts) from power supply 94 and each is connected to the power source terminals H and N. If the external power source connected to terminals H and N is a 115 or 230 volt ac line, for example, the H and N terminals merely refer to the hot and neutral sides of the line, respectively. However, if the external power source is dc, the H terminal may be the positive side of the source and the N terminal the negative side. In addition, each I/O module 81-88 includes an IN/OUT terminal which is of dual function. If the I/O point is to be operated as an output point, the IN/OUT terminal for that point is connected to the controlled element (or load) in the process which that point is assigned to control. On the other hand, if the I/O point is to be operated as an input, the IN/OUT line for that point receives the input signal from the input device. The same IN/OUT line thus serves both functions, depending on the command from the microcontroller 90 and the second (or reference) connection of the input or output device. As an example, I/O point 82 is shown operating as an output point, turning power on or off to a load device 89. Load 89 is connected between the IN/OUT line of I/O point 82 and the N line to the power source. By contrast, I/O point 84 is shown operating as an input point with an input switching device 91 connected between the IN/OUT line and the H line of the power source. Any one of I/O points 81–88 may be operated in the output mode either as a dc source, as a dc sink, or as an ac source, depending somewhat on the internal circuitry of the I/O point. That aspect of the circuitry is discussed more fully herein below.

Information provided to the microcontroller 90 from each I/O point 81–88, via the M line connection, includes data reporting the status of load current (high or low), the level of power supplied to that I/O point, the temperature condition of the I/O point, the status of any input device, and still other information, all of which will be set forth in greater detail subsequently herein.

Control of each I/O point 81–88 is ultimately determined by a central processing unit as outlined in connection with FIG. 1. In FIG. 3, communication with such a CPU is through an interface port (preferably a serial port) of microcontroller 90 and through a data communications link 106 (28 of FIG. 1). Other I/O modules substantially similar to module 80 of FIG. 3 may also be connected to the data communications link 106. While microcontroller 90 is responsive to the commands of the central processing unit, it also provides localized, distributed control of each I/O point within the I/O module 80. Microcontroller 90 is an operations control unit and operates in accordance with a stored program and as a function of commands from the central processing unit and the signals received on the M line from each I/O point 81–88. Although not specifically illustrated in FIG. 3, microcontroller 90 also includes memory for program storage and for storage of other data necessary to carry out program execution and to achieve the intended control.

Figure 4:
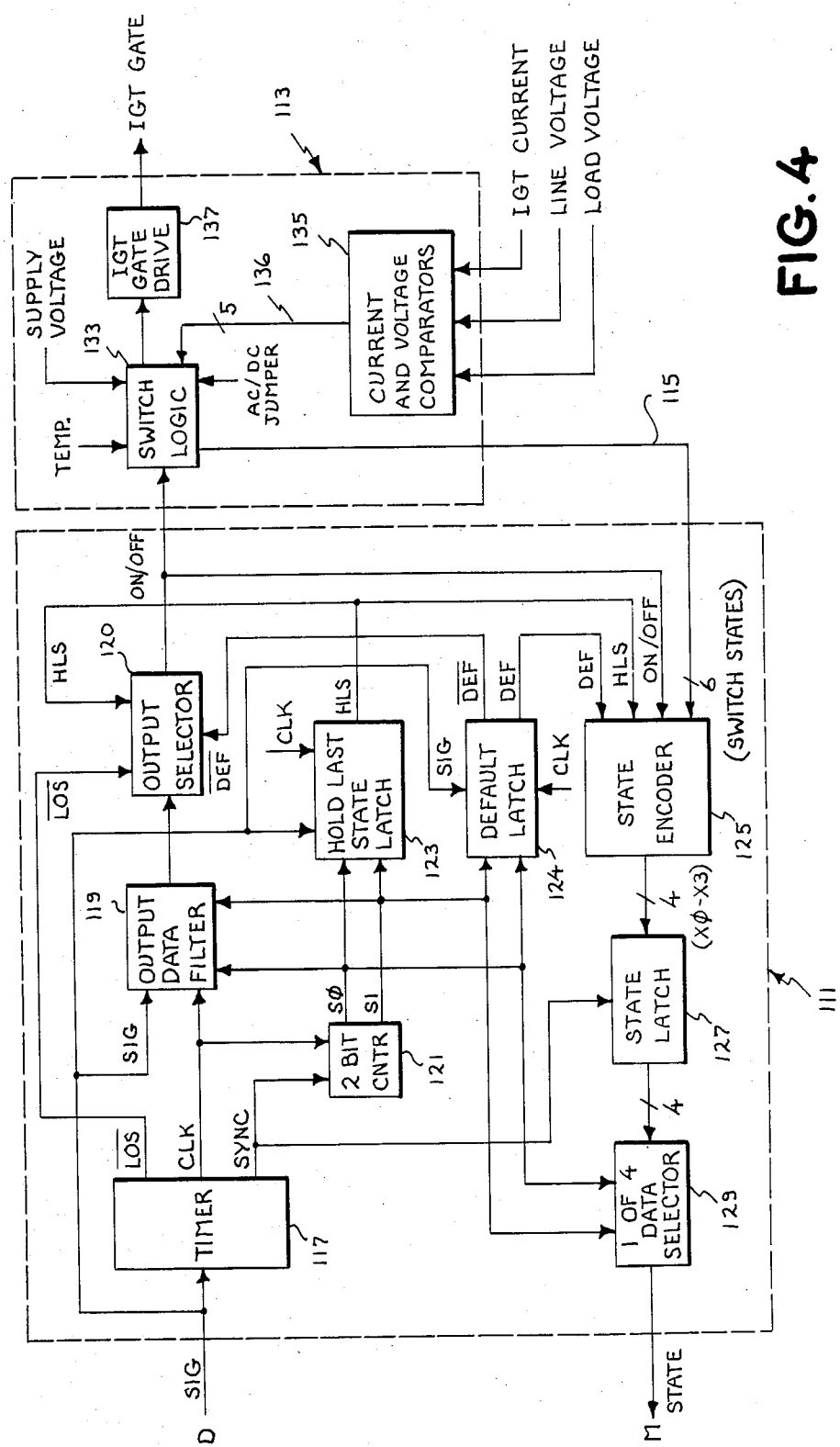
FIG. 4 is a simplified block diagram of a communications section and a control and sensing section for an I/O point of the type illustrated in FIG. 3.

The simplified block diagram of FIG. 4 shows a preferred embodiment of an I/O circuit exclusive of the output switching device. The I/O point thus includes a communications section 111 and a control and sensing section 113. The communications section 111 (to be discussed first) includes timer 117, output data filter 119, output selector 120, two-bit counter 121, hold last state latch 123, default latch 124, state encoder 125, state latch 127, and data selector 129.

Figure 5:
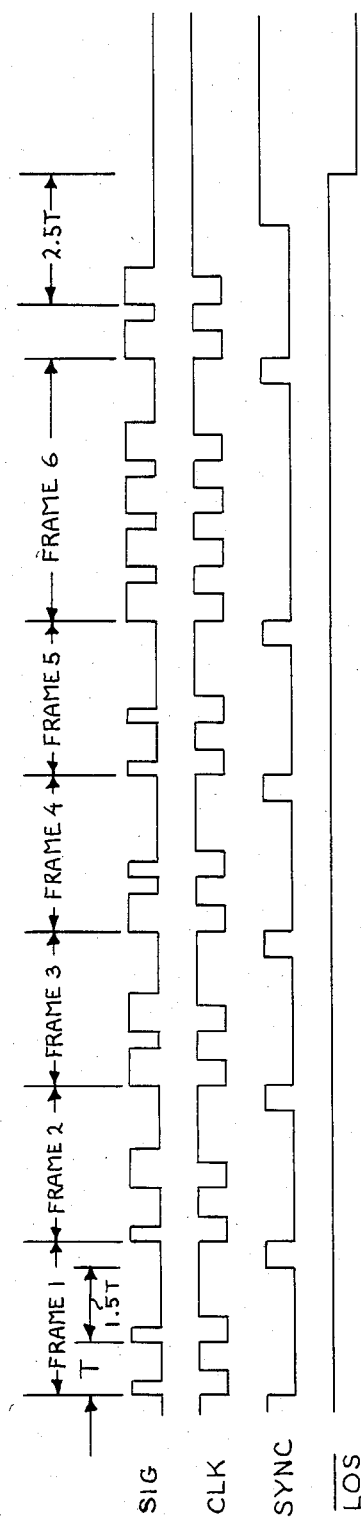
FIGS. 5 and 6 are illustrations of waveforms showing the relationship between certain signals relevant to the circuitry of FIG. 4.
Figure 6:
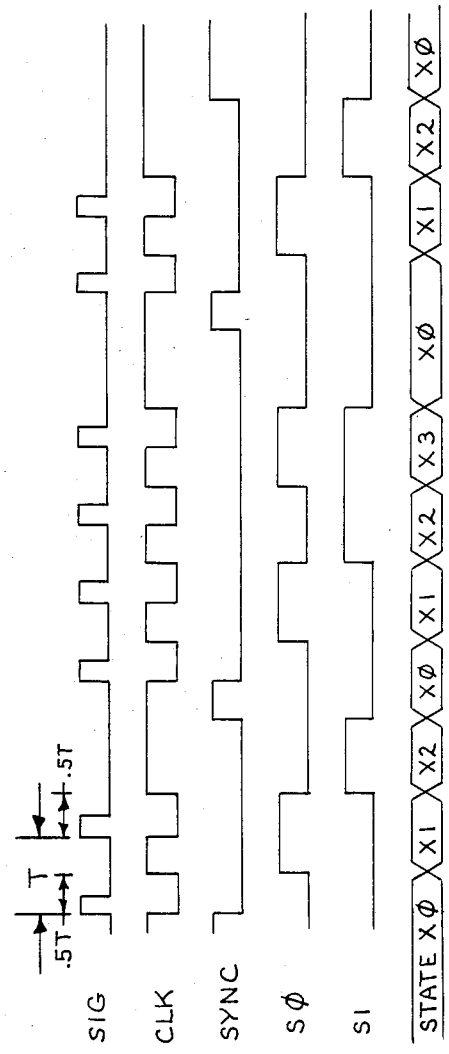

The communications section 111 receives, on line D, a signal SIG from the operations control unit (e.g., as from microcontroller 90 of FIG. 3) and a set of state indicative (diagnostic) signals on a six conductor bus 115. The communications section 111 produces an ON/OFF command signal to the control and sensing section 113 and transmits a diagnostic signal (STATE) to the microcontroller on line M. The ON/OFF command signal ultimately controls a switching device (preferably an insulated gate transistor, or IGT, to be discussed subsequently) whose operation depends on whether the I/O point is to serve as an input or as an output. FIGS. 5 and 6 illustrate the relationship between certain signals involved in the operation of the communications section 111 and should be referred to in conjunction with FIG. 4.

The control signal SIG is a coded pulse train containing on/off information, hold last state (HLS) information, default state (DEF) information, and timing information. It consists of a series of "frames", each of which contains either two or four pulses followed by the omission of a pulse, i.e., a "missing pulse". The "missing pulse" serves to resynchronize operation of the communications section 111. Each of the two or four pulses has a duty cycle of either 25 percent or 75 percent. The time between pulses within a frame, T, is fixed and is also the time duration of the "missing pulse". The control signal SIG is initially applied to a timer 117 wherein its rising edge causes the timer 117 to reset and to initiate its timing cycle. Thus, the timer 117 puts out a rising edge of the clock signal CLK approximately 0.5T after each rising edge of SIG. The CLK signal is used to click two bit counter 121, output data filter 119, and latches 123 and 124. Unless first reset, the timer 117 also puts out a rising edge of the synchronizing signal SYNC approximately 1.5T after a rising edge of SIG, and it puts out a falling edge of the $\overline{LOS}$ signal at some significantly longer time after a rising edge of SIG (e.g., 2.5T). Normally, rising edges of SIG occur at intervals of T so that the timer 117 is reset before the SYNC or $\overline{LOS}$ transitions can occur. However, upon the occurrence of a "missing pulse" (synchronizing interval), a time 2T occurs between rising edges of SIG, causing SYNC to go high for approximately 0.5T. The SYNC pulse resets the communications section 111 and thus signals that a new frame is about to start. If a period of more than 2.5T occurs between rising edges of SIG, $\overline{LOS}$ will go low, signalling to the communications section 111 that a loss of signal has occurred.

The on/off information passing to the I/O point on line D is contained in the first two pulses of each frame of the control signal. A 75 percent duty cycle pulse corresponds to a logical "1" (switch on) and a 25 percent duty cycle corresponds to a logical "0" (switch off). As will become clear, the clock pulse which occurs at 0.5T after the rising edge of a SIG pulse, effectively causes a sampling of the SIG pulse at that time. Thus, if a 25% duty cycle (0.25T) pulse has been transmitted, a low level or "zero" is obtained at 0.5T. On the other hand, if a 75% duty cycle (0.75T) pulse has been transmitted, a high level or "one" is obtained at 0.5T. The first two pulses are also transmitted redundantly; that is, the first two pulses must agree (both 1 or both 0) in order for the communications section 111 to respond to the ON/OFF command. For these purposes, the control signal SIG is provided to output data filter 119 which effectively samples and compares the first two pulses of the control signal. If the two pulses are different (due, for example, to noise interference), the output data filter 119 maintains the last valid ON/OFF command which was received.

If a frame of the control signal contains four pulses rather than two, then the third and fourth pulses are used to update the hold last state latch 123 and the default latch 125, respectively. The contents of these latches 123 and 124 are only changed when third and fourth pulses are received. A logical one in the third pulse position sets the hold last state signal HLS high; a logical zero in the third pulse position causes the HLS signal to go low. The HLS signal appears at the output of the HLS latch 123 and is provided to the output selector 120 and to the state encoder 125. Similarly, a fourth pulse sets the default signal DEF high or low (high=On, low=Off). The default signal DEF and its complement $\overline{DEF}$ appear as outputs from the default latch 124. The default signal DEF is supplied to the state encoder 125 and its complement $\overline{DEF}$ is supplied to the output selector 110. In the event of a loss of communications from the microcontroller (i.e., a loss of the control signal causing $\overline{LOS}$ to go low), the HLS signal commands the output selector 120 to either hold the previous on/off state or to assume the default state. If HLS is a logical one, then the previous state will be maintained; if HLS is equal to zero, then the default state will be assumed as soon as $\overline{LOS}$ goes low. The advantage of this operation is apparent: in the event of a loss of communications between the I/O point and the controlling device (i.e., the microcontroller of FIGS. 1 and 3) the on/off condition is forced into a pre-selected, preferred state.

The two-bit counter 121 counts CLK pulses to provide an output count, S0 and S1, which takes binary values between zero and three. This count value is indicative of which pulse in a frame is being received and is provided (as S0 and S1) to the output data filter 119, hold last state latch 123, default latch 124, and data selector 129 so that each circuit responds only to the appropriate pulses of a frame.

The waveforms of FIG. 5 illustrate the signal relationships SIG, CLK, SYNC, $\overline{LOS}$, and the On/Off signal for various conditions. For the first frame (the frames are arbitrarily designated with frame numbers for ease of reference), redundant 25 percent duty cycle pulses are sent corresponding to "0" or an Off switch state. Clock pulses are produced at 0.5T after each rising edge of a SIG pulse. Following the two redundant pulses, there is a synchronizing interval or "missing pulse". The missing pulse causes a SYNC pulse to be produced, signifying the end of a frame. Since the two SIG pulses are both of 25 percent duty cycle, the ON/OFF value remains low and the $\overline{LOS}$ value remains high.

For the second frame, the first SIG pulse is of 25 percent duty cycle and the second is of 75 percent duty cycle. The lack of identity may result from noise interference, for example. In such case the CLK and SYNC pulses are again produced as in the first frame and $\overline{LOS}$ remains high. Since the SIG pulses are different, however, the ON/OFF signal retains its previous value, which, in this case is low. In the third frame, the SIG pulses are both of 75 percent duty cycle duration, signalling that the ON/OFF switch signal should be raised to the ON level. This occurs at the rising edge of the clock pulse following the second SIG pulse. For the fourth frame, pulse identity is lost between the control pulses and so the on/off line remains high. The fifth frame returns the on/off line to a low level with the occurrence of redundant pulses both having 25 percent duty cycles. The sixth frame of SIG pulses includes four 75 percent duty cycle pulses. The sixth frame is somewhat extended in time duration to accommodate the four pulses and the "missing pulse". The first and second SIG pulses return the ON/OFF signal to high. Although not shown, the third pulse of the frame causes HLS to go high simultaneously with the rising edge of the resulting clock pulse, and the fourth pulse of the frame causes DEF to go high.

In addition to on/off, default, and hold last state information, the control signal SIG provides timing for returning status or diagnostic data to the microcontroller. State encoder 125 accepts, as inputs, six switch states on conductor bus 115 from the control and sensing section 113, along with the ON/OFF, DEF, and HLS bits. The state encoder 125 combines these input signals to form a four-bit encoded status message which is provided to state latch 127. Data selector 129 is a one-of-four selector which accepts the four bits of data from the state latch 127 and then sequentially sends this four bit state information to the microcontroller via the M line. The output of the two-bit counter 121 indicates the count of the SIG pulses and controls the data selector 129 such that it sends out one bit for each SIG pulse received. The four bits are coded so that the first bit (X0) indicates whether or not a fault condition exists and the second bit (X1) indicates whether or not voltage appears on the output load. If a fault occurs (X0=0), the third and fourth bits (X2 and X3) indicate the nature of the fault. If no fault has occurred (X0=1), then the third bit is indicative of the hold last state value and the fourth bit is indicative of the default value.

The microcontroller 90 (FIG. 3) determines how much information is to be received from the communications section 111 by the number of pulses per frame contained in the control signal, SIG, which is sent to the communications section 111. The microcontroller reads the state signal on line M immediately after it puts a rising edge of SIG on the D line. Thus, the number of pulses per frame in the control signal and the number of status bits read back per frame are the same. Normally, the microcontroller puts out two pulses per frame and reads back X0 and X1. If X0 indicates a fault, the microcontroller then shifts to four pulses per frame so that it can read a fault message contained in the X2 and X3 bits. In the absence of a fault, the four-pulse mode may also be used to read and write to the HLS latch 123 and the default latch 124. In such case, the third and fourth pulses of SIG either set or reset the HLS and default latches, 123 and 124 respectively, and X2 and X3 of the state signal indicates the status of these two latches.

The control and sensing section 113 of FIG. 4 includes switch logic circuitry 133, comparator circuitry 135, and a gate drive circuit 137. The switch logic circuitry 133 receives the ON/OFF signal produced by the communications section 111 and, depending on the status of other input signals, provides a corresponding gate signal, via the gate drive circuit 137, to the gate terminal of a power switching device. The power switching device is preferably an insulated gate transistor which will be more fully discussed hereinbelow.

Among the other signals provided to switch logic circuit 133 are signals representative of the power supply voltage level and the temperature of the power switching device. Signals representing line and load voltage and load current are provided as inputs to the comparator circuit 135. The comparator circuitry 135 develops a set of signals which indicates the level of load current with respect to a pre-selected low limit, an intermediate limit, and a high limit. The comparator circuitry 135 also provides a signal indicative of the level of load voltage with respect to the line voltage level, and, for ac, a signal indicative of the ac zero crossing. All of these signals are provided as inputs to the switch logic circuit 133 via a five conductor bus 136. An additional input to switch logic circuit 133, denominated ac/dc, is provided for pre-selecting operation in either the ac mode or the dc mode.

The switch logic circuit 133 provides the set of diagnostic signals supplied to state encoder 125 via the six conductor bus 115. This set of diagnostic signals is derived from the voltage and current level signals provided by comparator circuitry 135 and from the temperature and supply voltage signals. The six diagnostic signals may be used, for example, to indicate: (1) that there is an open or disconnected load; (2) that load is in excess of a first high limit value requiring an immediate protective response; (3) a load current in excess of a second high limit value requiring a protective response only if the current remains above the limit for some pre-selected time period; (4) that load voltage has, or has not, been applied; (5) the relative level of the supply voltage; and (6) the relative temperature of the power switching device.

Various input/output switching circuits may be provided to be controlled by the gate signal emanating from the control and sensing section 113. For example, switching means comprising field effect transistors or silicon controlled rectifiers (SCRs) may be used as the input/output switching circuits. A preferred switching circuit will, in any case, include a shunt current path including means for providing a signal indicative of the current to a connected load. The switching circuits most preferred, however, make use of an insulated gate transistor, or IGT.

Figure 7A:
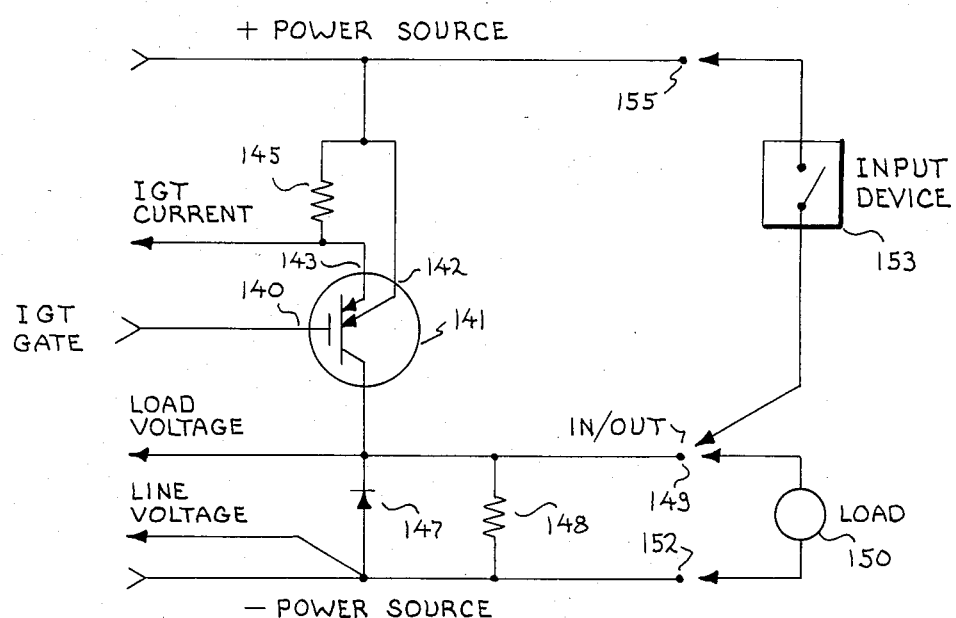
FIGS. 7A, 7B, and 7C are schematic diagrams illustrating various input/output switching circuits usable with the I/O circuit of FIG. 4--FIG. 7A showing a dc source circuit, FIG. 7B showing a dc sink circuit, and FIG. 7C showing an ac circuit.
Figure 7B:
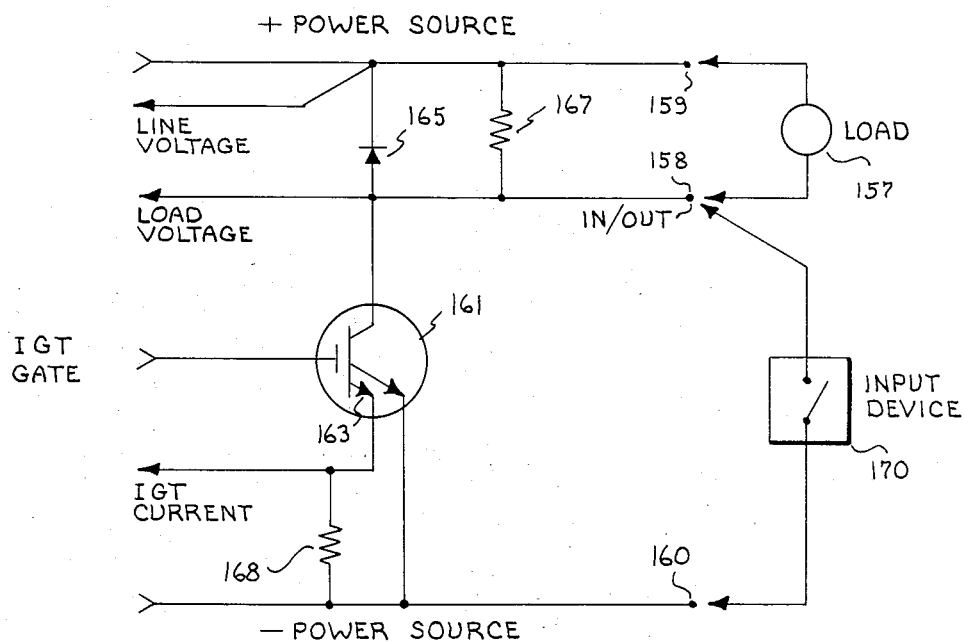
Figure 7C:
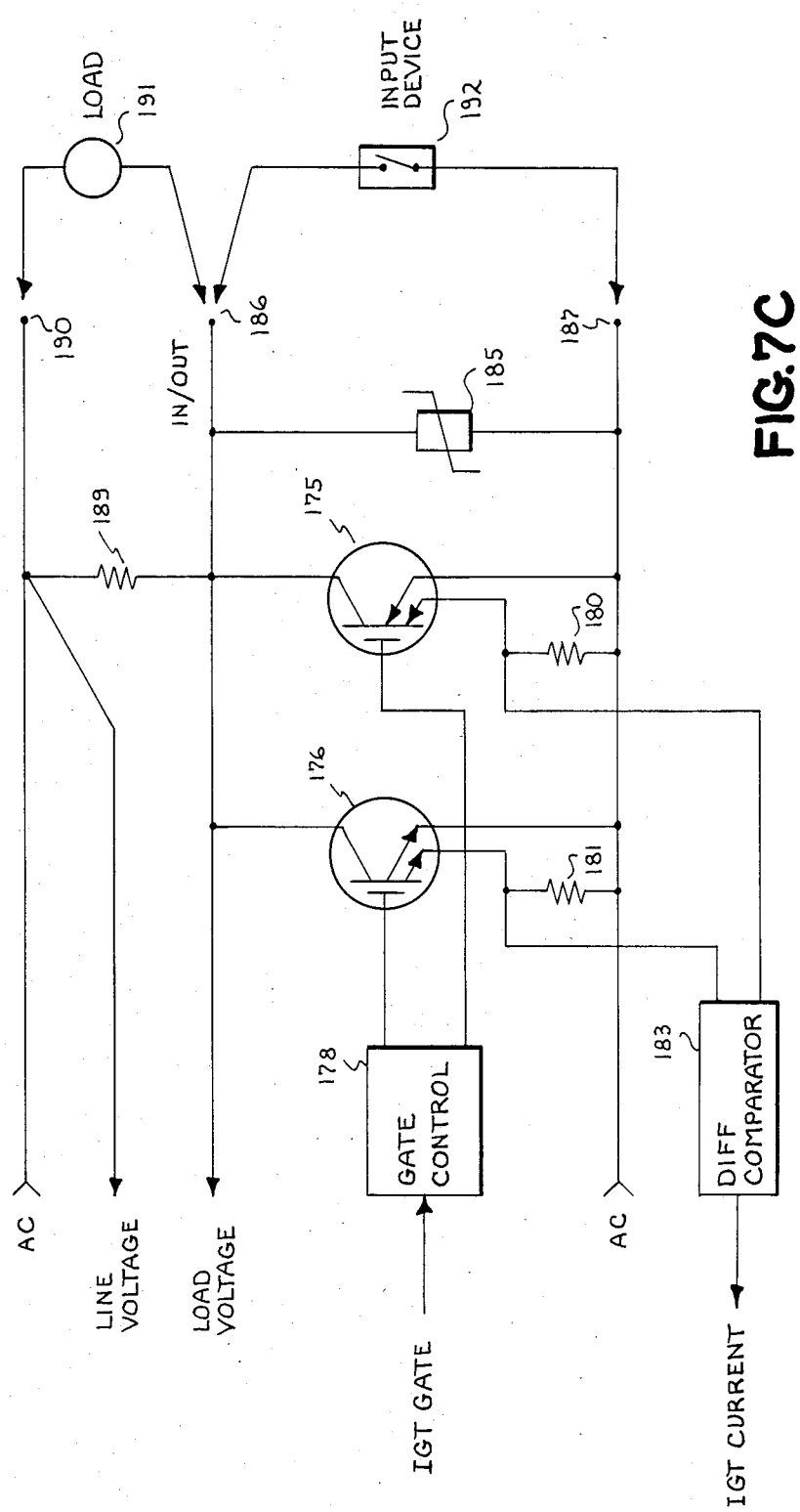

The IGT, in general, is a power semiconductor device which may be gated both into and out of conduction. That is, the IGT may be both turned on and turned off through its gate terminal. Some versions of the IGT include a current emulation section which is a section of the IGT provided to carry a proportional fraction of the total IGT current. The emulation section is advantageous in that it can be used to monitor the total current without resort to large power dissipating shunt resistors for current sensing. A single gate signal controls current flow both in the main section of an IGT and in its emulation section. The insulated gate transistor is described (albeit under a different name) in an article by B. J. Baliga et al., entitled "The Insulated Gate Rectifier (IGR): A New Power Switching Device", IEDM 82 (December 1982), pages 264–267. An IGT having an emulation section is the subject of a U.S. patent application, Ser. No. 529,240, of common assignee with the present invention, the disclosure of which is incorporated herein by reference. FIGS. 7A–7C show various input/output switching circuits using IGTs which may be used in the I/O system disclosed herein.

In the dc source circuit of FIG. 7A, the gate signal is applied to the gate terminal 140 of a P-channel IGT 141 having an emitter 142 for a main current section and an emitter 143 for an emulation current section. The positive side of the dc power source is connected directly to the main emitter 142, and, through burden resistor 145, to the emitter 143 of the emulation section. The collector of the IGT device is connected externally to one end of the parallel combination of a free-wheeling diode 147 and and pre-load resistor 148. The opposing end of the combination of diode 147 and pre-load resistor 148 is returned to the negative side of the dc power source. The junction of IGT 141 and the diode-preload resistor combination provides the IN/OUT terminal 149. Although, in actual use, both an input device and a load would not be connected at the same time, a load 150 is shown between IN/OUT terminal 149 and the load (i.e., output) return terminal 152, and an input device 153 is shown between the IN/OUT terminal 149 and the input return terminal 155. Return terminals 155 and 152 are electrically common, respectively, with the positive and negative lines of of the dc power source. Pre-load resistor 148 is relatively high in ohmic value and burden resistor 145 is of relatively low ohmic value as are the corresponding pre-load and burden resistors used in the circuits of FIGS. 7B and 7C. For example, for a 120 volt source, pre-load resistor 148 may be on the order of 20K ohms and burden resistor 145 may be on the order of ten ohms.

When the circuit of FIG. 7A is operated as an output, load current is controlled by turning the IGT 141 on and off at appropriate times. Load current passes from the power source, through the IGT 141 and the load 150, and back to the source. Load current monitoring is facilitated by the IGT emulation section which provides a load current indicative signal at the junction between burden resistor 145 and emitter 143. A load voltage signal, confirming that load voltage is indeed applied, is taken from the junction of the pre-load resistor 148 and the collector of IGT 141. A line voltage signal is taken from the opposite end of the pre-load resistor 148. The free-wheeling diode 147 is provided as a shunt for reverse currents from inductive loads.

When the circuit of FIG. 7A is operated as an input, the IGT is held in an off state. The state of input device 153 (open or closed) is then detected by monitoring the voltage developed across the pre-load resistor 148. This status signal is monitored via the load voltage line.

The dc sink input/output circuitry of FIG. 7B contains the same operative elements as does the source circuitry of FIG. 7A, but in a somewhat different configuration. When this circuitry is operated as an output, the load 157 is connected between the IN/OUT terminal 158 and the load return terminal 159. The IGT 161 is switched on or off to control the load current. Notable, however, is the fact that IGT 162 is an N-channel IGT. The collector terminal is connected to one end of the parallel combination of a free-wheeling diode 165 and pre-load resistor 167. This combination is in parallel with the terminals 159 and 158 to which the load 157 is connected. A burden resistor 168 is serially connected between the emulation section emitter and the negative side of the dc power source. The main section emitter is tied directly to the negative side of the dc power source. An IGT current signal, indicative of load current, is taken from the junction of the burden resistor 168 and the emulation section emitter 163. The load voltage signal is taken from the IN/OUT terminal 158 and the line voltage signal is taken from the positive side of the dc power source which is also connected to input return terminal 160. As with the dc source circuitry, discussed above, when the input/output circuitry is used as an input, the IGT 161 is held off and the state of the input device 170 is sensed by the voltage developed across the pre-load resistor 167. This status signal is transmitted via the load voltage line.

In FIG. 7C, illustrating an ac input/output circuit, parallel P and N channel IGTs, 175 and 176 respectively, are used. The IGT gate signal is applied to a gate control circuit 178 which provides two simultaneous gate control signals (of opposite polarity) for controlling (i.e., turning on and off) IGTs 175 and 176. The emulation section of IGT 175 is provided with series connected burden resistor 180 and the emulating section of IGT 176 is provided with series connected burden resistor 181. An IGT current signal, indicative of the load current in the IGTs, is provided by comparing the signals developed across the two burden resistors 180 and 181 in differential comparator 183. A transient voltage suppressor 185 is connected in parallel with the main section of the IGTs and between the IN/OUT terminal 186 and the input device device return terminal 187. The return terminal 187 is also electrically common with one side of the ac line. A pre-load resistor 189 is connected between the IN/OUT terminal 186 and the load return terminal 190. This latter terminal, 190 is connected to the other side of the ac line.

When the circuitry of FIG. 7C is operative as an output, gate control 178, in response to an IGT gate signal, commands the IGTs 175 and 176 to simultaneously be either on or off, thereby switching the load current on or off. The load 191 is connected between the IN/OUT terminal 186 and the load return terminal 190. When operated as an input, load 191 is not connected, and an input switching device 192 is connected between the IN/OUT terminal 186 and the return terminal 187. The IGTs 175 and 176 are held in the off state and the state (i.e., the status) of the input switching device 192 is determined by the presence or absence of voltage on the load voltage line; the presence of voltage indicating a closed input switch.

Figure 8:
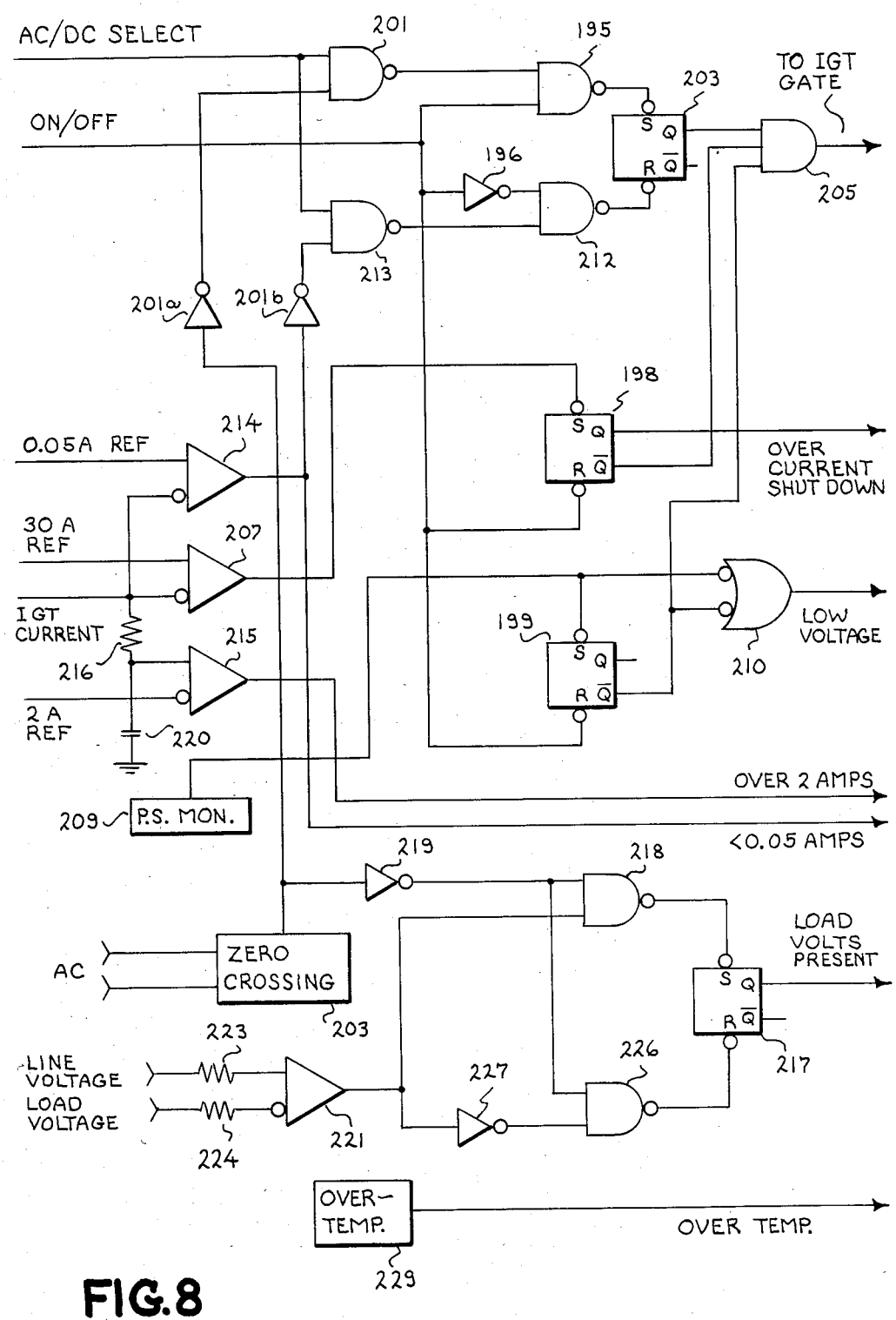
FIG. 8 is a schematic diagram illustrating in detail a control and sensing section for the I/O point of FIG. 4.

Referring to FIG. 8, showing the control and sensing section in greater detail, the ON/OFF signal from the communications section is applied to one input of NAND gate 195, to inverter 196, and to the reset inputs of flip-flops 198 and 199. The other input of NAND gate 195 receives the output signal of NAND gate 201. The first input of NAND gate 201 is supplied with a signal which is either high or low, depending on whether the output circuit is to be operated as an ac output or as a dc output. It will be recognized that this signal may be provided by a switch or wiring jumper appropriately connecting the ac/dc select line to a high or low reference value. The remaining input of NAND gate 201 receives a signal from zero crossing detector 202, through inverter 201a, to indicate those instances in which the ac line voltage (for ac output circuits) is within a certain range of zero voltage. Thus, in the case of an ac output, NAND gate 195 passes the ON/OFF signal only during a zero crossing of the ac line voltage. Zero crossing detector 202 may be any one of a number of conventional circuits providing a signal indicating that the ac input signal is within some range of a zero crossing. For a dc output, the state of NAND gate 201 allows the ON/OFF signal to be passed by NAND gate 195. The ON/OFF signal from NAND gate 195 is applied to the set input of flip-flop 203. The Q output of flip-flop 203 is applied as one of the three inputs to AND gate 205, the output of which serves as the IGT gate signal.

The remaining two inputs to AND gate 205 are supplied by the Q outputs of flip-flops 198 and 199. Flip-flops 198 and 199 are both reset when the ON/OFF signal goes to the off state. Flip-flop 198 receives a set signal from comparator 207 whenever the IGT current exceeds a pre-selected value. Thus, a signal indicative of IGT current is applied to the inverting input of comparator 207 while a reference voltage representing an excessive level of IGT current is applied to its non-inverting input. For example, the reference voltage may have a value corresponding to 30 amps of current. Similarly, flip-flop 199 receives a signal on its set terminal from power supply monitor 209. Power supply monitor 209 may be any one of a number of well-known means providing a signal indicative of whether the dc power supply voltage is above or below some pre-selected value. Operatively, therefore, a low supply voltage or an excessively high IGT current will inhibit AND gate 205. This forces the IGT (which is connected to the output of AND 205) to an off state in which it remains until the fault condition is cleared.

The Q output of flip-flop 198 is provided for use as an overcurrent shutdown signal and is one of the six switch state signals provided to conductor bus 115 (FIG. 4). The Q output of flip-flop 199, in addition to going to AND gate 205, is also applied as one input to logic gate 210. The signal from power supply monitor 209 is applied to the remaining input of logic gate 210 so that its output signal is indicative of the status of the dc power supply. This output signal is also one of the six switch state signals.

Flip-flop 203 receives a reset signal from the output of NAND gate 212. Of the two inputs to NAND gate 212, the first is the inverted ON/OFF signal from inverter 196 and the second input is from NAND gate 213. The ac/dc selection signal is provided to one input of NAND gate 213 and the output of comparator 214, through inverter 201b, is provided to the other input. Comparator 214 is a monitor comparator for IGT current and has the IGT current signal applied to its inverting input. A reference voltage corresponding to a relatively low, minimal IGT current value (e.g., 0.05 amps) is applied to the non-inverting input of comparator 214. This combination, comprising NAND gate 212, inverter 196, NAND gate 213, and comparator 214, is operative through flip-flop 203 to prevent the IGT from being switched (in an ac mode of operation) unless the IGT load current is less than the reference value.

The IGT current signal is also applied to the non-inverting input of comparator 215 wherein it is compared with an intermediate reference current value. The intermediate reference current value (e.g., corresponding to two amperes) is applied to the inverting input of comparator 215. However, also connected to the non-inverting input of comparator 215 is a time delay network comprising resistor 216 and capacitor 220. The combination of resistor 216 and capacitor 220 causes the voltage at the non-inverting input of comparator 215 to be delayed with respect to the IGT current. Thus, only if the IGT current exceeds the reference value for an extended period of time will the output of comparator 215 be affected. If the overcurrent is merely of short duration, then no change of state of comparator 215 occurs. Both the output of comparator 215 and the output of comparator 214 are provided as switch state signals. These signals serve as diagnostic signals and indicate, respectively, whether the IGT current is above or below the intermediate reference value and whether it is above or below the low reference value so that corrective action can be initiated by the microcontroller if necessary.

In case the IGT current exceeds the intermediate reference value, corrective action is taken only if the overcurrent is of sufficient magnitude and time duration to trip comparator 215. That is, the load current may exceed the intermediate reference value for some time before corrective action is taken. It is preferable, in some instances, to eliminate the time delay network (i.e., resistor 216 and capacitor 220) and carry out the time delay function by software routines implemented in the microcontroller. Comparison of the IGT, or load current, with the low, or minimal value, reference allows the generation of a diagnostic signal (e.g., 0.05A) that is indicative of whether a load is connected, or if connected, whether it is open. The Q output of flip-flop 217 is a diagnostic switch state signal indicative of whether or or not voltage is present at the connected load. The set input terminal of flip-flop 217 is connected to the output of NAND gate 218. NAND 218 receives the inverted ac zero crossing signal from inverter 219 on its first input terminal and receives the output of comparator 221 on its remaining input terminal. Comparator 221 compares the line and load voltages to provide a logic signal which indicates whether the load voltage is greater or less than a pre-selected percentage of the line voltage. For example, the output signal may be indicative of whether the load voltage is greater or less than 70 percent of the line voltage. The line and load voltages are applied, respectively, through input resistors 223 and 224 to the input terminals of comparator 221. Functionally, NAND gate 218 prevents a change of state of the output of flip-flop 217 whenever the ac line voltage is within a certain range of zero volts. In effect, therefore, decisions regarding the status of the load voltage are not made whenever the ac line voltage is near a zero crossing.

Flip-flop 217 is reset by the output from NAND gate 226. The first input of NAND gate 226 is provided with the inverted zero crossing signal from inverter 219 and the second input is provided with the output from the comparator 221 after it is inverted by inverter 227.

The remaining switch state signal is provided by temperature monitor 229 and is indicative of the relative temperature of the IGT (or IGTs in the case of an ac output) switching device. The temperature monitor 229 is preferably a simple P-N junction temperature detector 229 which is in good thermal communication with the IGT. The temperature detector 229 may be selected, for example, to provide an indication that the IGT temperature has exceeded 150° C.

Figure 9C:
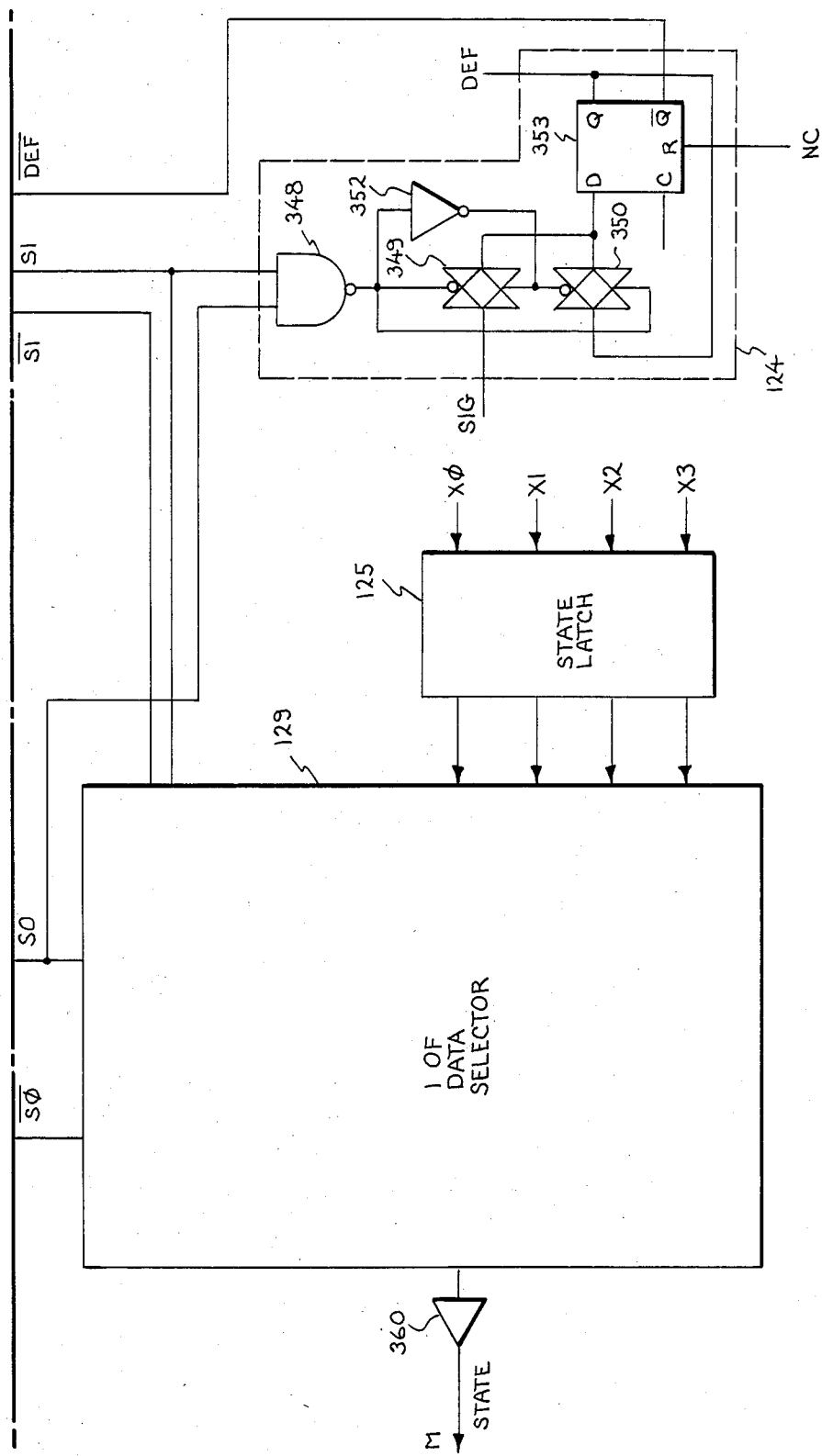

FIG. 9, comprising FIGS. 9A–9C, illustrates an embodiment of the communications section (111 of FIG. 4) in greater detail. The output signals from timer 117 are derived from an RC timing network comprised of resistor 300 and timing capacitor 301. Resistor 300 and capacitor 301 are connected in series between a positive voltage source +V and a common circuit point. The junction between the resistor 300 and capacitor 301 is connected to the inverting input of LOS comparator 303 and to the non-inverting inputs of SYNC and CLOCK comparators, 304 and 305, respectively. Resistors 308–312 comprise a voltage divider network in which the resistors are serially connected between +V and the common circuit point. Each junction between the resistors 308–312 of the divider network thus provides a voltage reference. The highest reference voltage, taken from the junction between resistors 308 and 309, is applied to the non-inverting input of comparator 303. The other voltage reference values, in descending order of voltage level, are correspondingly applied to the inverting inputs of sync comparator 304 and clock comparator 305, and to the non-inverting input of control compartor 314.

The collector terminal of transistor 315 is connected through collector resistor 316 to timing comparator 301, the other end of which is connected to the emitter of transistor 315. The on-off state of transistor 315 controls the charge-discharge cycle of capacitor 301 and is itself, in turn, controlled by the Q output from flip-flop 317. A resistor 318 is connected between the base terminal of transistor 315 and the Q output of flip-flop 317. The reset terminal of flip-flop 317 receives the output signal from control comparator 314. Control comparator 314 continuously compares the voltage across the timing capacitor 301 (applied to the inverting input of comparator 314) with the reference voltage from the junction of resistors 311 and 312.

In considering operation of timer 117, it may be assumed initially that the Q output of flip-flop 317 is at a low level, holding transistor 315 off so that capacitor 301 is charged to some level of voltage such that the output of control comparator 314 is low. Under these conditions, a rising edge of a pulse applied to the clock input of flip-flop 317 through buffer amplifier 320 causes a high level to appear at the Q output. This turns transistor 315 on, discharging timing capacitor 301. With the discharge of capacitor 301, the CLK signal output of comparator 305 is forced to a low level. The output of comparator 304, if not already low, is also forced to low and the output of LOS comparator 303 is forced high if it is not already in that state.

The discharge of capacitor 301 is detected by comparator 314 whose output goes high, resetting flip-flop 317. The Q output of flip-flop 317 then goes low, turning transistor 315 off, thus allowing the capacitor 301 to begin recharging. Once the recharged voltage is sufficiently high, the clock comparator 305 is triggered, producing a high level CLK signal. If capacitor 301 is allowed to continue to charge, some voltage level will be reached which will trigger, first the SYNC comparator 304, and then the LOS comparator 303. The SYNC comparator 304 is thus triggered by a "missing pulse" and the LOS comparator is triggered by a loss of SIG lasting for approximately 2.5 T as has been described.

In FIG. 9B the SIG and CLK signals are applied to output data filter 119 which includes flip-flops 325 and 326, exclusive NOR gate 329, NAND gate 328, inverter 330, and transmission gates 331 and 332. The SIG and CLK pulses are applied, respectively, to the D and C inputs of flip-flop 325 which operates to retain, at its Q output, the high or low state of the immediately previous SIG pulse so that the values of the first two pulses of a frame are compared. When the clock pulse appears, the SIG value is either high or low depending on whether the pulse value is 75 percent or 25 percent duty cycle. For a 25 percent duty cycle pulse, the Q output of flip-flop 325 is forced low; for a 75 percent duty cycle pulse, the Q output is high. Thus, there is in effect a sampling of the SIG value at each occurrence of the clock pulse. The Q output value from flip-flop 325 is applied to one output of exclusive NOR gate 329 and the SIG value is applied to its other input. Thus, the current pulse value and the previous pulse values are compared in exclusive NOR 329 whose output is at a high level whenever the inputs are the same.

The output from exclusive NOR 329 is applied as one input to NAND gate 328 which receives count pulses S0 and S1, respectively, on its other two inputs. The values of S0, $\overline{S0}$, S1 and $\overline{S1}$, taken together, indicate which pulse in a frame is being received. Therefore, if the first two pulse values of a frame are the same and if it is the second pulse that is being received, the output of NAND gate 328 assumes a logical zero value. At all other times and under other conditions, the output of NAND gate 328 is a logical one.

A logical zero at the output of NAND gate 328 thus indicates agreement between the first two pulses of a frame and a valid condition for updating the $\overline{Q}$ output of flip-flop 326. To that end, the output from NAND gate 328 is applied in parallel to the input of inverter 330 and opposing control terminals of transmission gates 331 and 332. A logical zero at the output of NAND gate 328 causes transmission gate 332 to be turned off and transmission gate 331 to be turned on passing the control signal SIG to the D input of flip-flop 326. The occurrence of a clock pulse then clocks the new value through to the output of flip-flop 326.

On the other hand, if there is a lack of redundancy in the first two pulses of a frame, the output of NAND gate 328 is a logical one, causing transmission gate 331 to be held off and transmission gate 332 to be held on. Under these conditions, the output of flip-flop 326 is fed back through gate 332 causing flip-flop 326 to hold the previous output state. The $\overline{Q}$ output of flip-flop 326 therefore represents a filtered version of the on-off signal which is then passed to output selector 120.

In addition to the filtered on-off signal, output selector 120 receives the $\overline{LOS}$ signal and the hold last state and complementary default signals, HLS and $\overline{DEF}$ respectively. The function of output selector 120 (which includes NOR gates 335–337 and OR gate 338), is to select a desired value for the output ON/OFF signal in the event of a loss of communications between an I/O point and the microcontroller, i.e., a loss of the control signal SIG. Should such a loss in communications occur, the output selector 120 provides an output ON/OFF signal which is either the last transmitted value of SIG or a default value, depending on the signals HLS and $\overline{DEF}$ supplied as control inputs to the selector 120.

The HLS and $\overline{DEF}$ signals are generated by the hold-last-state latch 123 and the default latch 124, respectively. These latches are substantially identical, but respond to different pulses in a control signal frame. The HLS latch 123 includes NAND gate 340, transmission gates 342 and 343, inverter 344, and flip-flop 345; the default latch 124 (FIG. 9C) includes NAND gate 348, transmission gates 349 and 350, inverter 352, and flip-flop 353. Since the circuit configuration and operation of these two latches is substantially identical, only the HLS latch 123 requires any detailed explanation.

The HLS latch 123 responds to the third pulse in a control signal frame (i.e., it responds to high level $\overline{S0}$ and S1 pulses from two bit counter 121) in a manner that allows the latch output to be updated. The $\overline{S0}$ and S1 pulses are applied as inputs to NAND gate 340 whose output controls transmission gates 342 and 343. The output of NAND gate 340 is applied to a first set of opposing control terminals of transmission gates 342 and 343 and to the inverter 344. The output of the inverter 344 is applied to a second set of opposing control terminals of transmission gates 342 and 343. Thus, in operation, transmission gate 343 is turned on and transmission gate 342 is turned off by the occurrence of a third pulse in the control signal frame. Since the control signal is applied as the input to transmission gate 343, the signal is passed through to the D input of flip-flop 345, thereby updating the HLS signal which is taken from the Q output of flip-flop 345. The HLS output is also fed back to the input of transmission gate 342 so that, in the absence of a third pulse in a control sigal frame, the HLS value remains latched. The clock signal is applied to the CLOCK input of flip-flop 345. The output of the HLS latch 123 is supplied to the output selector 120.

By comparison, the default latch 124 operates in substantially the same manner but responds to the fourth pulse in a frame. That is, the default latch responds to the S0 and S1 pulses of a control signal frame. Notable, however, is the fact that the output of the default latch 124 is taken from the $\overline{Q}$ output of flip-flop 353 so that the complementary signal $\overline{DEF}$ is supplied to the output selector 120.

In normal operations, the output selector 120 functions to simply invert and pass the control signal from flip-flop 326 which signal then becomes the on-off output signal applied to the control and sensing section 113 (FIG. 4). However, upon loss of communications between the I/O point and the micro controller (i.e., a loss of the control signal SIG), the output ON/OFF signal is forced to a predetermined, desired state determined by the $\overline{LOS}$ and HLS signals. These latter signals are both applied as inputs to the output selector 120. In the event there is a loss of communications, the output selector 120 either holds the last state or selects a default state, depending on which has been pre-selected. The pre-selection is made to force the I/O point to a preferred, safe state should there be a communications loss.

The $\overline{LOS}$ and HLS signals are inputs to NOR gate 335 whose output is one input to NOR gate 337. The second input to NOR gate 337 is the signal from the $\overline{Q}$ output of flip-flop 326. Thus, NOR gate 335 controls NOR gate 337 so that if either $\overline{LOS}$ or HLS are at a high level, NOR gate 337 simply inverts the control signal from flip-flop 326. On the other hand, if $\overline{LOS}$ is low (loss of communications) and HLS is also low, the output of NOR gate 335 is high, holding the output of NOR gate 337 at a low level.

The $\overline{LOS}$, HLS, and DEF signals are applied to NOR gate 336 whose output, along with the output from NOR gate 337, are applied as inputs to NOR gate 338. The output of OR gate 338 is the control ON/OFF signal. Thus, with a loss of communications ($\overline{LOS}$ low) and no command to hold the last state (HLS low), the output ON/OFF signal from OR gate 338 is selected to be the default signal, DEF (i.e., $\overline{DEF}$ becomes inverted by OR gate 336). The operation is such, therefore, that if there is a loss of communications and the hold last state is not selected, a default condition is selected. Whether the last state is held if the default condition is selected is, of course, controllable by appropriately setting the HLS latch 123 and the default latch 124.

The foregoing describes the forward path through the control and communications section 111 in detail. The return of encoded diagnostic information, is, as has been discussed above, through state latch 125 and one of four data selection 129. The encoding of the information is discussed in detail in connection with FIG. 10; however, at this point it is sufficient to note that the inputs, X0–X3, to state latch 125 are encoded to contain the diagnostic and other information to be returned to the microcontroller 90 of FIG. 3. The state latch 125 may be a commercially available device such as the Model MC14174, available from Motorola Inc. The encoded information, X0–X3, is latched into the state latch 125 on the rising edge of the SYNC signal which is also supplied to the state encoder 125. Thus, a new set of data is latched in on each frame of the control signal. This data forms a diagnostic signal indicative of the operating parameters of the I/O point.

The data from state latch 125 is transmitted bit-by-bit through one of four data selector 129 to the microcontroller 90 through buffer amplifier 360. The data selector 129 responds to the current value from 2-bit counter 121 to cause the values of X0–X3 to be fed through in order. Thus, for example, as the first pulse in a frame is being received, the X0 bit of diagnostic data is simultaneously transmitted. The data selector 129 may be a commercially available device, such as the Model MC14052 from Motorola, Inc.

FIG. 10 illustrates a truth table for a state encoder such as encoder 125 of FIG. 4. An encoder in accordance with the truth table of FIG. 10 may readily be implemented with standard combinational logic elements by one of ordinary skill in the art.

Referring to FIG. 10, the input conditions are listed horizontally across the top of the left-hand portion of the table. Underneath, in columnar fashion, are the possible values that each input may take. In the table, "ones" indicate that a value is true (e.g., a high level signal), "zeroes" indicate that a value is not true, and X's indicate "don't cares" (i.e., may either be one or zero without effect). The 4-bit output (X0–X3) of the state encoder 125 is shown in the right-hand portion of the table wherein X0–X3 are distributed horizontally across four columns. Each horizontal row across the four columns is thus a 4-bit word which uniquely defines the state of the I/O point. This 4-bit word is the diagnostic data which is returned to the microcontroller 90 of FIG. 4 and ultimately to the controller CPU (FIG. 1).

For example, in the truth table, the first row shows a high level in the low voltage column while the remaining columns are indeterminate "don't care" conditions. Under thee circumstances the 4-bit output is uniquely determined to be all zeroes. This all zero 4-bit word signals a loss of the I/O point power supply. By further example, row six shows that the output is commanded on, but that the output is in a shorted condition. That is, a one appears in column one under ON/OFF indicating that the I/O point is to be turned on, while simultaneously, there is an overcurrent indication in the overcurrent column (col. 6). The 4-bit output word for this condition is all zeroes except that X3 is at the one level. Similarly, there is a set of fifteen unique 4-bit words that define the various conditions of the I/O point.

The foregoing described features of an improved input/output system having utility in connection with programmable controllers. While the best mode contemplated for carrying out the invention has been described, it is understood that various other modifications may be made therein by those of ordinary skill in the art without departure from the inventive concepts inherent in the true invention. Accordingly, it is intended by the following claims to claim all modifications which fail within the true spirit and scope of the invention.

The invention claimed is:

1. Overcurrent protected input/output control circuitry for use in an input/output (I/O) system of a programmable controller, comprising:
   control means for controlling load current to a connected load, said control means being responsive to a command signal to be turned on and off and including a main current section for carrying a major portion of said load current and a shunt current section for carrying a fractional portion of said load current;
   current sensing means responsive to said fractional portion of the load current for provision of a signal indicative of load current;
   first reference means for providing a first reference signal, said first reference signal being indicative of an intermediate level of load current; and
   first comparator means, including timing means, for receiving said load current indicative signal and said intermediate reference signal and operative to initiate said command signal for causing said control means to turn off the load current at a time which depends on (i) the time duration that said load current indicative signal exceeds said intermediate reference signal, and (ii) the magnitude of said load current indicative signal.

2. The input/output circuitry of claim 1 wherein said control means comprises an insulated gate transistor (IGT) of the type having a current section corresponding to said main current section and an emulation section corresponding to said shunt current section.

3. The input/output circuitry of claim 2 further including:
   second reference means providing a second reference signal, said second reference signal being indicative of an excessive level of load current and being greater in magnitude than said intermediate reference signal; and
   second comparator means receiving said load current indicative signal and said second reference signal, said second comparator causing initiation of said command signal turning said switching means off substantially immediately upon said load current indicative signal exceeding said second reference signal.

4. The input/output circuitry of claim 3 further including:
   third reference means providing a third reference signal, said third reference signal being indicative of a minimal level of load current and being lesser in magnitude than said intermediate reference signal; and
   third comparator means receiving said load current indicative signal and said third reference signal, said third comparator providing a diagnostic signal indicative of insufficient load current whenever said load current indicative signal is less than said third reference signal.

5. The input/output circuitry of claim 4 wherein said current sensing means comprises a relatively low ohmic valued resistor.

6. The input/output circuitry of claim 5 wherein said timing means comprises a resistance-capacitance timing network.

7. In an input/output system of a programmable controller, an overcurrent protected output switching circuit, comprising:
   an insulated gate transistor (IGI) responsive to a command signal to be turned on and off for controlling electrical current flow to a connected load, said IGT having a main section for carrying a major portion of said load current and an emulation section for carrying a relatively small fractional portion of said load current;
   first circuit means responsive to the emulation portion of said load current to provide a signal indicative of the total load current; and
   second circuit means responsive to said load current signal for initiating said command turning the IGT off at a time which depends upon the occurrence of excessive current therethrough and the time duration and magnitude of said excessive current.

8. The output switching circuit of claim 7 wherein said first circuit means comprises a low ohmic valued resistor.

9. The output switching circuit of claim 8 wherein:

said second circuit means includes timing means comprising a resistance-capacitance network for receiving the load current signal and providing a delayed value thereof; and said second circuit means includes a first reference source providing a first reference value indicative of a first reselected value of said excessive current and a first comparator providing a comparison of the delayed value of load current and the first reference value such that said command is initiated turning the IGT off whenever said delayed value exceeds said reference value.

10. In a programmable control system, an input/output circuit capable of providing diagnostic information regarding its current loading conditions, such circuit comprising:

an insulated gate transistor (IGT) responsive to a command signal to be turned on and off for controlling current flow to a connected load, said IGT having a main section for carrying a major portion of said load current and an emulation section for carrying a fractional portion of said load current;

current sensing means adapted to be responsive to the fractional portion of said load current for provision of a load signal indicative of total load current;

first circuit means responsive to said load signal to provide a first diagnostic signal indicative of whether the load current is above or below a first preselected value thereof;

second circuit means responsive to said load signal to provide a second diagnostic signal indicative of whether the load current is above or below a second preselected value thereof, said second preselected value being greater in magnitude than said first preselected value; and third circuit means responsive to said load signal to provide a third diagnostic signal indicative of whether the load current is above or below a third preselected value thereof, said third preselected value being lesser in magnitude than said first preselected value.

11. The input/output circuit of claim 10 further including means for receiving said first diagnostic signal and operative to command said IGT off at a time depending on the duration of time that said load current is above said first preselected value.

12. The input/output circuit of claim 11 further including means for receiving said second diagnostic signal and operative to command said IGT off substantially immediately when said load current is above said second preselected value.

13. The input/output circuit of claim 12 wherein said third preselected value is substantially less than said first preselected value and said third diagnostic signal is indicative that said load is open or disconnected whenever said load current is less than said third preselected value.

14. For use in an input/output (I/O) system of a programmable controller, I/O control circuitry capable of providing diagnostic information indicative of its operating condition, comprising:

switching means for controlling load current to a connected load, said switching means being responsive to be turned on and off by a command signal and having a main current section for carrying a major portion of the load current and a shunt current section for carrying a fractional portion of the load current;

current sensing means responsive to said fractional portion of load current for providing a load current signal;

first circuit means responsive to the load current signal for providing a set of signals indicative of the range of load current;

second circuit means for providing a load signal indicative of the voltage level applied to said connected load;

third circuit means for providing a line voltage signal indicative of the voltage level of a supplied operating voltage for such input/output circuitry; and encoding means responsive to said set of load current signals, said load voltage signal, and said line voltage signal for providing an encoded diagnostic signal having an encoded value which depends on said signals and which is indicative of said operating condition.

15. The I/O control circuitry of claim 14 further including a temperature sensing means responsive to the temperature of said switching means for providing a temperature indicative signal thereof, and wherein said encoding means is further responsive to said temperature signal.

16. The I/O control circuitry of claim 15 wherein said switching means comprises an insulated gate transistor.

17. The I/O control circuitry of claim 16 wherein said first circuit means comprises comparator circuits and said set of load current signals includes signals indicative of high, intermediate, and low levels of load current.

* * * * *